G. F. MESSER.
DIRIGIBLE HEADLIGHT.
APPLICATION FILED JUNE 28, 1919.
1,343,822.
Patented June 15, 1920.
2 SHEETS—SHEET 1.
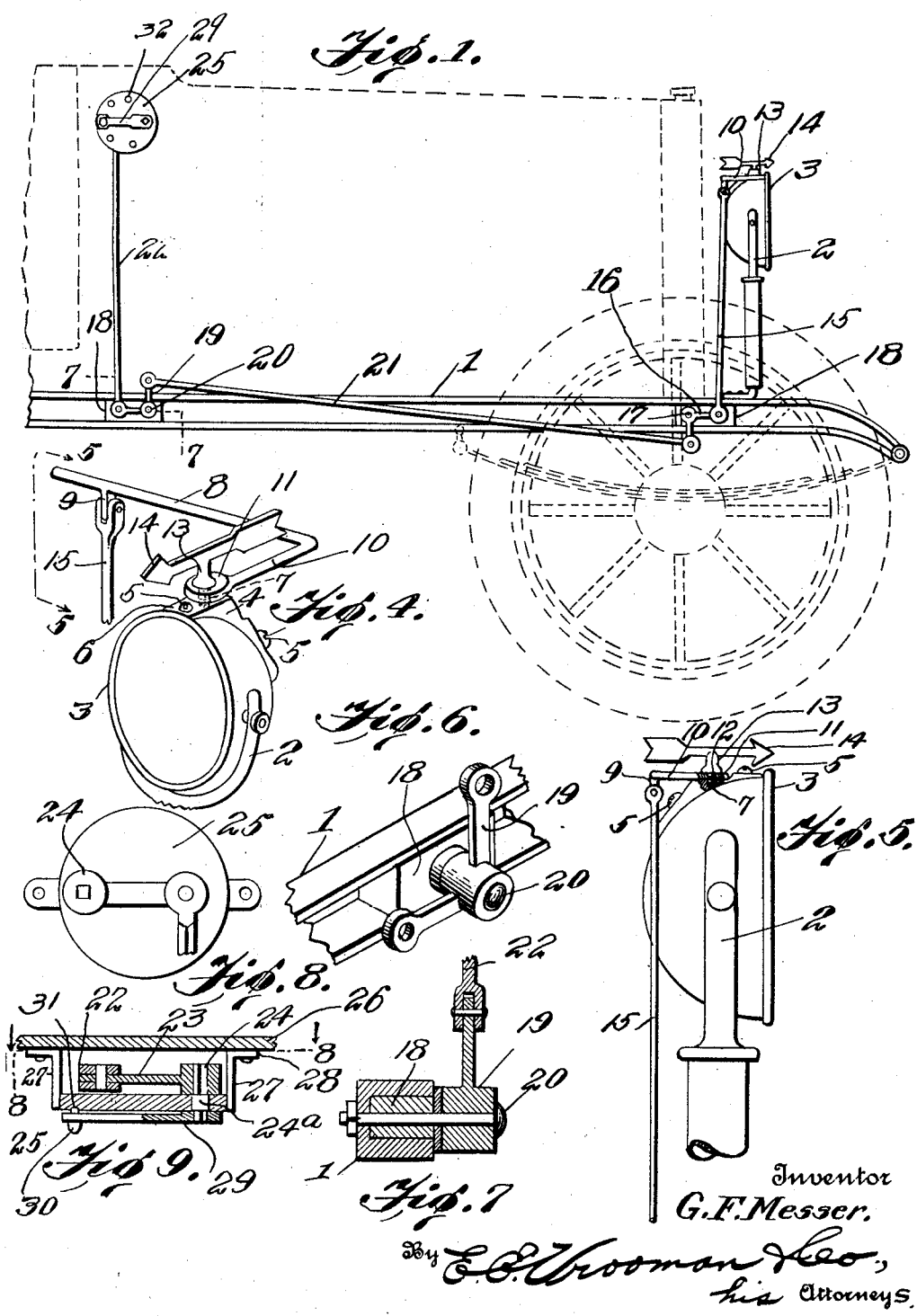
Inventor
G. F. Messer.

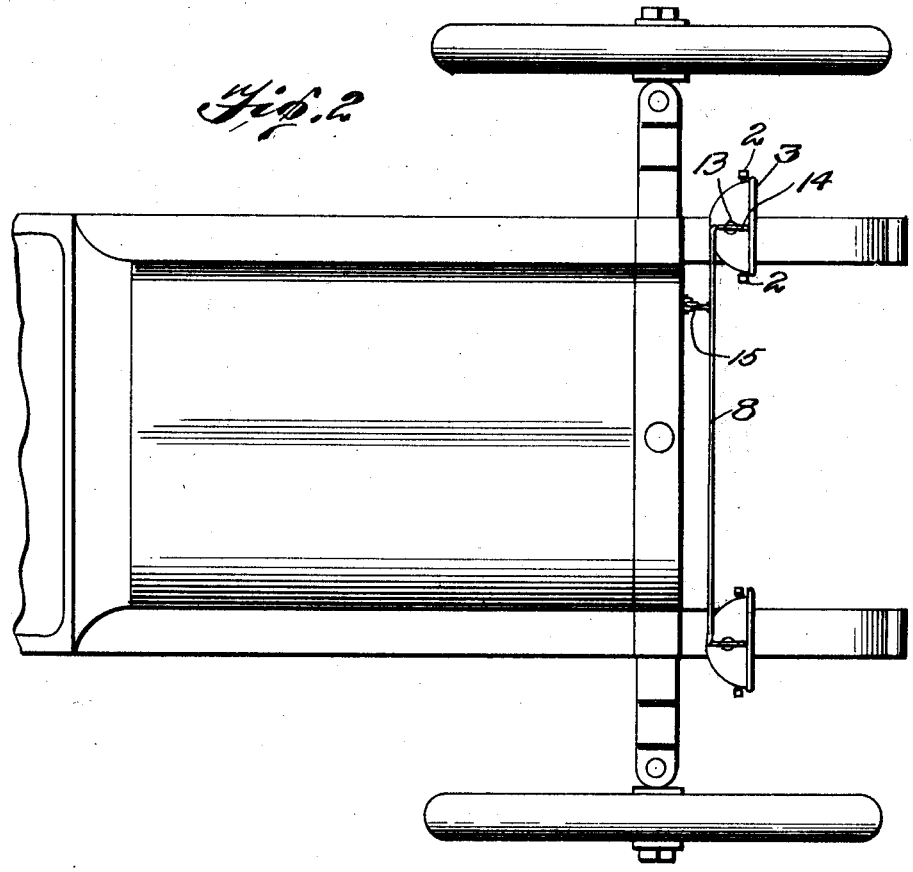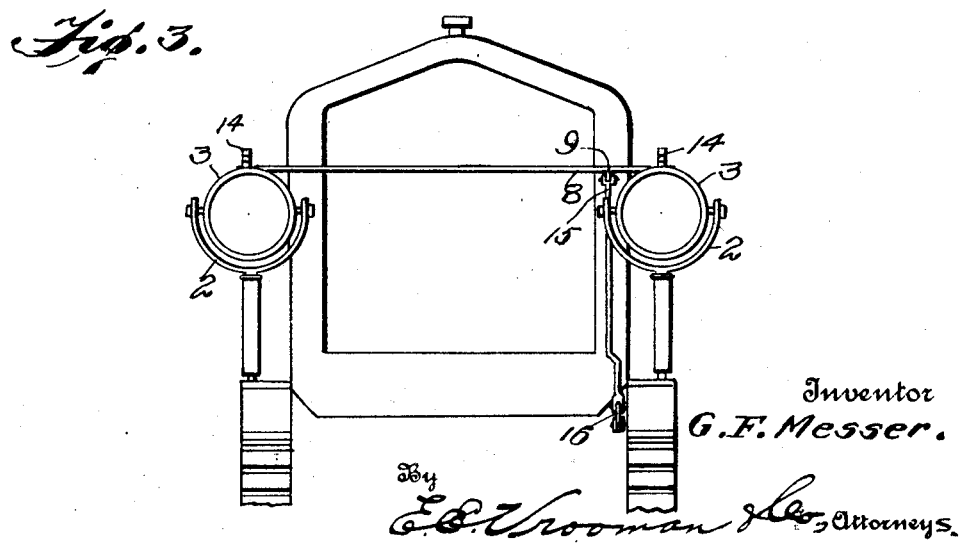

UNITED STATES PATENT OFFICE.

GEORGE F. MESSER, OF ABERDEEN, WASHINGTON.

DIRIGIBLE HEADLIGHT.

1,343,822. Specification of Letters Patent. Patented June 15, 1920.

Original application filed July 23, 1918, Serial No. 246,342. Divided and this application filed June 28, 1919. Serial No. 307,286.

*To all whom it may concern:*

Be it known that I, GEORGE F. MESSER, a citizen of the United States, residing at Aberdeen, in the county of Grays Harbor and State of Washington, have invented certain new and useful Improvements in Dirigible Headlights, of which the following is a specification, reference being had therein to the accompanying drawings.

This invention relates to dirigible headlights for automobiles, and has for its object the provision of comparatively simple yet efficient means for tilting or swinging the headlights of an automobile in a vertical plane.

Another object of the invention is the construction of a device for swinging the headlight or headlights of an automobile through the medium of a hand-operated device located close to the chauffeur or driver of the machine.

This is a divisional case out of my application, Serial No. 246,342, filed July 23, 1918, patented August 12, 1918, No. 1,312,560 relating to a dirigible headlight for automobiles.

With the above-mentioned objects and other objects in view, my invention comprises certain novel constructions, combinations, and arrangements of parts as will be hereinafter specifically described, illustrated in the accompanying drawings, and more particularly pointed out in the appended claims.

In the drawings,

Figure 1 is a view in side elevation of a tilting apparatus constructed in accordance with the present invention.

Fig. 2 is a fragmentary plan view of a motor vehicle showing my apparatus attached thereto, while Fig. 3 is a front view of the same.

Fig. 4 is an enlarged, fragmentary, perspective view of one of the lamps showing the tilting apparatus connected thereto, while—

Fig. 5 is a view taken on line 5—5, Fig. 4, looking in the direction of the arrows.

Fig. 6 is a fragmentary, perspective view of the frame and the primary bell-crank.

Fig. 7 is a section taken on line 7—7, Fig. 1.

Fig. 8 is an inside view of the supporting plate taken on line 8—8, Fig. 9, looking in the direction of the arrows.

Fig. 9 is a horizontal section taken through the supporting plate.

Referring to the drawings by numerals, 1 designates the side sills, U-shaped (Figs. 6 and 7) in cross section, upon which are mounted the lamp-supporting yokes 2. These yokes 2 are mounted to swing in a horizontal plane, as fully disclosed in my prior application, hereinbefore identified, and pivotally mounted upon these yokes 2 are lamps 3, these lamps 3 are free to swing in a vertical plane, as hereinafter described.

To each lamp 3 is detachably secured a plate 4, by means of screws 5; this plate has a flat upper face 6, and in this face is a threaded socket 7 (Fig. 5). A horizontal connecting rod 8 is provided intermediate its ends with a depending, apertured lug 9, and the ends 10 of rod 8 are bent at right angles and have their outer extreme ends flattened as at 11, and each flattened portion 11 is apertured, and through the aperture is passed the threaded end 12 of the standard 13 (Fig. 5) of the indicating arrow 14. The threading of end 12 into socket 7 detachably secures the flattened end 11 to the plate 4.

A primary vertical rod 15 is pivotally connected at its upper end to the apertured lug 9, and it is pivotally connected at its lower end to the outer end of the auxiliary bell-crank 16. The bell-crank 16 is pivotally mounted at 17 upon block 18, which block is held between the top and bottom of one of the U-shaped sills 1 like the block clearly shown in Fig. 6, thus, by reason of the outer face of the block being flush with the outer edges of the frame, placing the bell-crank outside of the frame and free to swing in a vertical plane upon its pivot 17. The primary bell-crank 19 is pivotally mounted at 20 upon another block 18, secured in the same manner upon the U-shaped sills 1 as the first-mentioned block. A horizontal, intermediate, connecting rod 21 is connected at its outer end to the lower end of bell-crank 16 and is connected at its inner end to the upper end of bell-crank 19, and the lower end of bell-crank 19 is connected to an auxiliary, vertical rod 22, which rod 22 is pivotally connected at its upper end to the outer end of arm 23, which arm 23 is mounted upon a squared shaft 24 (Fig. 9), and shaft 24 has a round hub 24ª that is journaled in the supporting plate 25, which plate is held away from the support 26, constituted by a portion of the automobile, by means of legs 27; each leg 27 is provided with a flat, angularly-disposed foot 28 that is secured against the support 26 (Fig. 9). The outer end of shaft 24 is squared, and upon this squared end is secured the handle 29, which handle is provided with an operating knob 30. The inner end of the knob extends through the handle 29 and is rounded as at 31, which inner rounded end 31 fits in one of the sockets 32, whereby the handle 29 is retained in an adjusted position upon the outer face of plate 25.

The operation of the apparatus is as follows: The operator grasps the knob 30, and by exerting pressure on the knob to swing the handle 29 over the face of plate 25, the arm 23 will be moved in unison with arm 29, causing rod 22 to actuate the primary bell-crank 19, and thus in turn moving rod 21 and then auxiliary bell-crank 16, and then primary vertical rod 15, which in turn will pull or push upon the horizontal connecting rod 8, causing the lamps 3 to be swung in a vertical plane upon the yokes 2. It will be obvious that the lamps can be moved for casting their rays upward or downward, at the will of the operator, depending merely upon the swinging of the handle 29 over the face of the plate 25, and when the desired position of the lamps has been secured, then the inner rounded end 31 of the knob 30 is left in one of the sockets 32, thereby holding the lamps securely in their adjusted position for casting the rays at the desired angle in a vertical plane.

In the accompanying drawings and in the foregoing description, I have preferably illustrated and described the preferred form of my invention, but certain minor changes or alterations may appeal to one skilled in the art to which this invention relates, in manufacturing my device, and, therefore, I reserve the right to make such minor alterations and changes as shall fairly fall within the scope of the appended claims.

What I claim is:

1. In an apparatus of the class described, the combination with supporting means, lamps pivotally mounted upon said supporting means to swing in a vertical plane, of plates provided with upper flat faces carried by said clamps, each flat face having a threaded socket, a connecting rod engaging said flat faces and provided with apertures registering with the threaded sockets, means extending through the apertures of the rod and threaded into said sockets, and means connected to said rod for swinging said lamps in a vertical plane.

2. In an apparatus of the class described, the combination with supporting means, lamps pivoted upon said supporting means to swing in a vertical plane, of plates engaging said lamps, means detachably securing said plates to said lamps, each plate provided with a flat upper face and having a threaded socket in said flat face, a connecting rod provided with right angularly-disposed ends, said ends being flattened and provided with apertures therein, said flattened ends resting upon the flat faces of the plates and having their apertures registering with the threaded sockets, means provided with standards resting upon the flattened ends of the connecting rod, said standards provided with lower threaded ends, said threaded ends extending through the apertures of the flattened ends of the rod and into the threaded sockets of the plates, and means connected to the connecting rod for manually adjusting the same and thereby swinging the lamps in a vertical plane.

3. In an apparatus of the class described, the combination of side sills, U-shaped in cross section, yokes supported upon said side sills, lamps pivotally mounted upon said yokes, blocks secured within one of said U-shaped side sills, bell-cranks pivotally mounted upon the outer faces of said blocks outside of the edges of the side sills, means pivotally connecting said bell-cranks, means pivotally connecting one of the bell-cranks to said lamps, and manually-operated means connected to the other bell-crank whereby, when the manually-operated means is actuated, the lamps will be moved upon the yokes.

4. In an apparatus of the class described, the combination with a support, lamps pivotally mounted upon said support, of a plate placed from and carried by said support, a shaft rotatably mounted upon said plate and provided with square ends, an arm secured upon one of said ends between the plate and the support, a handle secured upon the other square end on the outside of said plate, and means connected to the arm and to the lamps whereby, when the handle is swung upon the face of the plate, the lamps will be adjusted upon the support.

5. In an apparatus of the class described, the combination with a support, pivotally-mounted lamps carried by said support, of a plate provided with legs, said legs provided with flat feet, said feet engaging the support, means securing said feet to said support, a shaft provided with a rounded portion journaled upon the plate and having inner and outer square ends, said plate provided with a curved row of sockets in its outer face, a handle secured upon the outer square end of said shaft, said handle provided with a knob and said knob having an inner rounded end, said rounded end adapted to fit in any one of the sockets for holding the handle in an adjusted position upon the plate, an arm positioned between the plate and the support and mounted upon the inner square end of the shaft, and rod and bell-crank means pivotally connected to the arm and to the lamps whereby, when the handle is swung or adjusted upon the plate, the lamps will be moved or tilted in a vertical plane.

In testimony whereof I hereunto affix my signature.

GEORGE F. MESSER.